Patented Dec. 5, 1922.

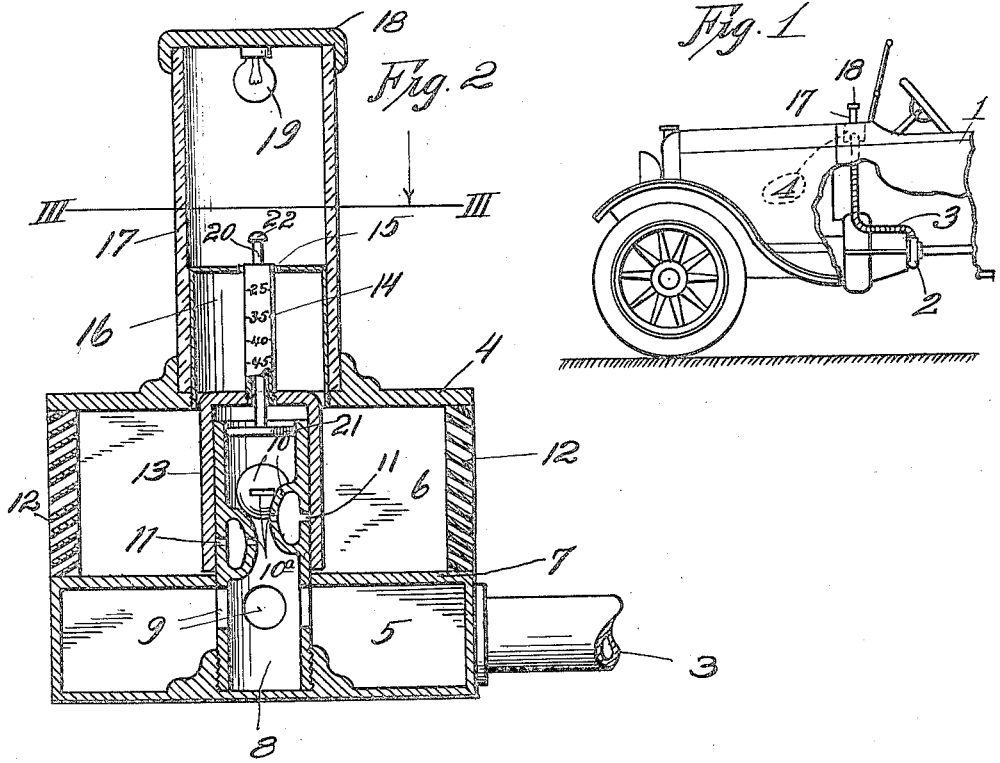
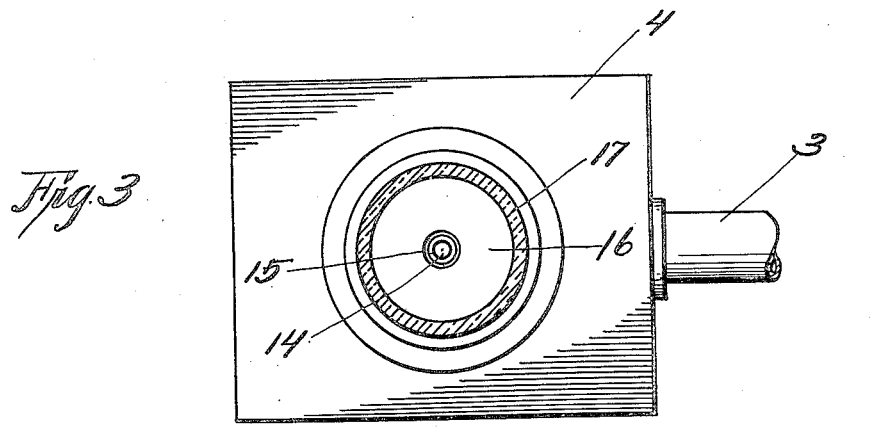

1,437,714

UNITED STATES PATENT OFFICE.

GLENN A. BREWER, OF KANSAS CITY, MISSOURI.

AUTOMATIC SPEED-SIGNALING DEVICE.

Application filed March 7, 1921. Serial No. 450,447.

*To all whom it may concern:*

Be it known that I, GLENN A. BREWER, citizen of the United States, and resident of Kansas City, county of Jackson, State of Missouri, have invented a certain new and useful Improvement in Automatic Speed-Signaling Devices, of which the following is a complete specification.

This invention relates to speed indicating signals for automobiles, and has for its object to produce a device of this character which will emit an audible signal when the speed of the automobile has attained a predetermined rapidity.

It is well known that many drivers of motor cars habitually exceed a safe speed and that it is difficult for a policeman or other officer or a pedestrian to fairly estimate such speed or accurately determine whether the car is traveling in excess of an authorized speed. It is, therefore, desirable to provide a signal uncontrollable by the motorist which will make it impossible for the car to be driven at a higher rate than the authorized speed without signaling the public to that effect. A device of this character can be required by municipal ordinance or police regulation without discrimination and will obviously prove of great benefit to the public as it will deter drivers when traveling in congested districts particularly, from driving beyond an authorized speed, and, furthermore, will minimize the possibility of accidents to pedestrians and to others at street crossings.

Another object is to produce a signal of this character which cannot be tampered with by the driver, and which will, therefore, be always in condition to warn pedestrians, automobilists and municipal officers or the like that the car is traveling at an excessive rate of speed.

A still further object is to produce a signal of such a character that it will simultaneously with the audible signal exhibit a visible signal showing the speed at which the car is traveling.

With the objects named in view and others as may hereinafter appear, the invention consists in certain novel and useful features, construction and organization of parts as are hereinafter described and claimed; and in order that it may be fully understood reference is to be had to the accompanying drawing, in which:

Figure 1 is a side view of an automobile, partly broken away to more clearly illustrate the invention.

Figure 2 is an enlarged central vertical section through the device of the invention.

Figure 3 is a section on the line III—III of Figure 2.

In the said drawing, where like reference characters identify corresponding parts in all of the figures, 1 is an automobile of any ordinary type, and 2 the casing of a blower geared to the transmission shaft of the engine, it being understood that the blower may be geared at any convenient point, but in this instance it is placed directly at the rear of the transmission case for convenience of illustration. It will also be understood that it might be geared to a wheel of the car.

Leading from the blower is a hollow flexible air conduit 3, connected at its opposite end with a hollow container 4 of any suitable size and design, and which may be secured either exterior of the wind shield as illustrated, or within the car if such position is found desirable. Container 4 is formed with a pair of internal chambers 5 and 6, separated from each other by a false bottom 7 formed in container 4.

Secured on the bottom of chamber 5 and extending vertically upward almost to the top of container 4 is a hollow cylindrical whistle tube 8 provided with a series of inlet openings 9 at its lower end and within chamber 5, and formed above said point and within chamber 6 with a series of sound producing members 10, said sound producing members being provided with slots 10$^a$ in register with slots 11 in the exterior wall of the whistle tube. It will be understood that air from the blower when it passes through the slots above-mentioned will produce a whistling sound, and that the construction of the sound producing members may be such that the noise produced by each whistle will be of different volume or tone, if this construction should be found desirable. The side walls of chamber 6 will be closed by a series of shutter members 12 as illustrated to provide exit openings for the escape of air after it has operated the whistles, as hereinafter pointed out and the exclusion of water or snow or the entry of an instrument designed to impede the operation of the whistles.

Slidingly fitting over the upper end of the whistle member and adapted to close by gravity the slots 11 in the chamber when the air pressure produced by the blower is not sufficient to overcome the weight thereof, is a sleeve member 13 carrying a pin 14 provided with a series of speed indicating marks corresponding with the slots in the whistle member, that is when the top slot 11 is exposed the sliding sleeve 13 moves pin 14 upwardly and therefore will expose the speed indicating mark of 45 through an opening 15 in a screen member 16 fitted in an opening formed in the top of the container 4.

Embracing the screen 16 and fitted in an opening in the top of the container 4 is a hollow tubular cage 17, preferably made of glass, closed at its upper end by a cap 18 and if desired bearing an electric lamp 19 for use at night, it being understood that the visible speed indicating element is adapted to be raised under air pressure up into the cage 17.

The operation of the device is such that, when the air pressure produced by the blower has reached a predetermined degree, the sliding sleeve 13 will be elevated and one of the whistles will function, and at the same time, the visible speed indicating member 14 will be projected through the opening 15 in the screen 16 and will be visible from the driver's seat. As the speed increases the whistles will be uncovered one after another. The whistles may be formed so that the tone of the combined noise emitted will change upon the exposure of each succeeding whistle.

It will, of course, be understood that when the automobile is running at a slow speed, that pressure will be developed in the whistle member, and in order to utilize this light pressure which is not sufficient to cause the whistle member to function and which would otherwise circulate back and pass out of the fan casing, I provide visible means whereby pedestrians, motorists and law enforcement officers may discover whether the conduit leading from the fan casing to the whistle chamber has been tampered with.

To this end member 14 is made tubular and fitting slidingly therein is the stem 20 of a disk 21, adapted for upward movement in tube 8 under light pressure developed within said tube by the operation of the fan or blower when the car is traveling at an authorized speed. As soon as the car starts, the pressure mentioned raises the disk and thus projects the upper end of stem 20 above the opaque screen 16, and thus indicates that the passage of air from the blower or fan to the whistle chamber is unobstructed. The stem 20 is provided at its upper end with a head 22 which guards against its dislocation when the car is at rest.

From the above description it will be apparent that I have produced a device of the character described which possesses all of the features of advantage pointed out and while I have described and claimed the preferred embodiment of the same I reserve the right to make all changes properly falling within the spirit and scope of the appended claims.

I claim:

1. In a device of the character described, the combination of a noise-producing member, a sliding sleeve yieldingly mounted on said member, means for directing air under pressure into said member for sliding said sleeve and causing the said noise-producing member to function, and a visible speed indicator mounted for sliding movement within said sliding sleeve and independent thereof.

2. In a device of the character described, the combination of a source of air supply controlled by the speed of the automobile, a member connected to said source of air supply, a sliding sleeve closed at one end and mounted on said member, noise-producing means in said member adapted to be controlled by said sliding sleeve, and a visible speed indicator mounted for sliding movement within said sleeve and independent thereof.

3. In a device of the character described, a casing provided with superposed chambers, the upper chamber having downwardly and outwardly sloping exit openings, a tube extending up through said chambers and having inlet openings communicating with the lower chamber and sound-producing openings at different heights for communication with the upper chamber, a sleeve mounted upon said tube and yieldingly actuated to normally cover the said sound-producing openings and closed at its upper end, a transparent cage mounted upon the casing and provided with a perforated partition, an opaque screen within said cage below said partition, and a speed indicating member mounted on said sliding sleeve and adapted to be projected through the partition into said cage.

4. In a device of the character described, the combination of a source of air supply varying in pressure according to the speed of the automobile, a double casing, having one of its chambers in communication with said source of air supply, a noise-producing means in communication with said last-named chamber and extending into the other chamber, a sliding sleeve mounted on said noise-producing means in said second chamber and adapted to move away from the first-named chamber in ratio to the pressure of air supplied thereto and thus cause the noise-producing means to function, a transparent cage mounted above said sliding sleeve and exterior to said chamber, and visible speed indicating means fitted on said sliding sleeve and adapted to be introduced into said cage under the movement of said sleeve.

5. In a device of the character described, the combination with a motor car, of means for supplying air under pressure proportionate to the speed of the motor car, a whistle tube formed with a plurality of whistles, an air conduit leading from the air supply means to said whistle tube, a sliding sleeve mounted for movement on said whistle tube and adapted for successively uncovering the whistles of said whistle tube as the air delivered to the whistle tube increases in pressure due to an increase in the speed of the motor car; whereby the combined tone upon the addition of each successive whistle shall indicate the comparative rate of speed of the motor car.

In witness whereof I hereunto affix my signature.

GLENN A. BREWER.